US006288515B1

United States Patent
Hiti et al.

(10) Patent No.: US 6,288,515 B1
(45) Date of Patent: Sep. 11, 2001

(54) SYSTEM AND METHOD FOR CONTROLLING A SURFACE-MOUNTED PERMANENT MAGNET SYNCHRONOUS MACHINE DRIVE OVER A WIDE SPEED RANGE USING A REFERENCE VOLTAGE

(75) Inventors: Silva Hiti, Torrance; Constantin C. Stancu, Anaheim, both of CA (US); Dragan S. Maric, Mt. Arlington, NJ (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/552,426

(22) Filed: Apr. 19, 2000

(51) Int. Cl.[7] ....................................................... H02P 5/28
(52) U.S. Cl. .......................... 318/722; 318/716; 318/807
(58) Field of Search .................................. 318/700–720, 318/800–818

(56) References Cited

U.S. PATENT DOCUMENTS

| 5,032,771 | * | 7/1991 | Kerkman et al. . |
| 5,196,778 | * | 3/1993 | Hayashida . |
| 5,504,404 | * | 4/1996 | Tamaki et al. . |
| 5,569,995 | * | 10/1996 | Kusaka et al. . |
| 5,659,235 | * | 8/1997 | Yamada et al. . |
| 5,739,664 | * | 4/1998 | Deng et al. . |
| 5,757,161 | * | 5/1998 | Ikkai et al. . |
| 5,923,728 | * | 7/1999 | Ikkai et al. . |
| 5,936,378 | * | 8/1999 | Iijima et al. . |
| 5,969,498 | * | 10/1999 | Cooke . |
| 5,990,657 | * | 11/1999 | Masaki et al. . |
| 6,163,128 | * | 12/2000 | Hiti et al. . |
| 6,184,648 | * | 2/2001 | Kato et al. . |

FOREIGN PATENT DOCUMENTS 11-299297 * 10/1999 (JP) .

* cited by examiner

Primary Examiner—Paul Ip
(74) Attorney, Agent, or Firm—Christopher DeVries

(57) ABSTRACT

A surface-mounted permanent magnet synchronous machine drive and a method of controlling the machine drive. Flux weakening and current regulating loops cooperate to provide automatic transition to the flux weakening mode (operation above base speed), regardless of DC bus voltage, load or other operating conditions. The modulation index (d) is used as a condition for automatic start of flux weakening operation is very useful because this point can be easily changed by software when necessary, regardless of the value of DC bus voltage. This feature provides significant performance improvement. No look-up tables are used in the flux weakening loop. The on-set point for flux weakening is automatically adjusted, and may be changed through software. An appropriate d-axis current component is injected over the entire speed range, providing the maximum available torque (which corresponds to the q-axis current component).

11 Claims, 2 Drawing Sheets

SYSTEM AND METHOD FOR CONTROLLING A SURFACE-MOUNTED PERMANENT MAGNET SYNCHRONOUS MACHINE DRIVE OVER A WIDE SPEED RANGE USING A REFERENCE VOLTAGE

BACKGROUND OF THE INVENTION

The present invention relates generally to electric vehicles and, more particularly, to a system and method for controlling a surface-mounted permanent magnet synchronous machine drive used in electric vehicles over a wide speed range using a reference voltage.

The assignee of the present invention designs and develops electric vehicles employing surface-mounted permanent magnet synchronous machine drives. One operation that is required when controlling such machine drives is flux weakening, which is when the machine drive operates above base speed.

One straight-forward approach is to employ a number of look-up tables to resolve flux weakening operation. In order to achieve results and performance similar to those of the present invention, the straight-forward approach mentioned above requires creation of numerous and cumbersome data structures, such as look-up tables, to handle all possible situations in the system and its environment.

A method presented in a paper authored by J. H. Song, J. M. Kim and S. K. Sul, entitled "A New Robust SPMSM Control to Parameter Variations in Flux Weakening Region", in *Proc. IECON'96*, pp. 1193–1198, 1996, attempts to provide a solution to the problem solved by the present invention. The Song et al. approach requires measurement of DC bus voltage.

It would be desirable to have a method that does not rely on look-up up tables and wherein automatic transition is accomplished at any operating conditions. It would also be desirable to have a method that does not require measurement of the DC bus voltage.

It is, therefore, an objective to provide for a system and method for controlling a surface-mounted permanent magnet synchronous machine drive over a wide speed range using a reference voltage. It is also an objective to provide for a system and method for controlling a surface-mounted permanent magnet synchronous machine drive used in electric vehicles.

SUMMARY OF THE INVENTION

The present invention comprises a surface-mounted permanent magnet synchronous machine drive and a method of controlling the machine drive. An exemplary surface-mounted permanent magnet synchronous machine drive comprises a motor, a voltage source inverter coupled between a battery and the motor that drives the motor, and a control system coupled to the inverter for controlling the inverter and the motor. The heart of the control system is a flux weakening circuit which functions to reduce the effective back emf reflected on a stator winding by injecting a negative current in the north rotor pole direction, and therefore weakening the rotor magnet effect on the stator winding voltage. In the invention, a feedback-based flux weakening strategy is used which is independent of motor and system parameters.

An exemplary control system comprises a first coordinate transformation circuit for processing measured motor phase current signals ($i_a$, $i_b$) and rotor position signals ($\theta_r$) to generate motor current signals in the synchronous frame ($i_d$, $i_q$). A flux weakening circuit processes torque command ($T^{ref}$), and d-axis and q-axis modulation index signals ($d_d$, $d_q$) calculated in the previous sampling interval to generate reference current signals ($i_d^{ref}$, $i_q^{ref}$). A current regulating loop processes the reference current signals ($i_d^{ref}$, $i_q^{ref}$) and the motor current signals ($i_d$, $i_q$) to generate new d-axis and q-axis modulation index signals ($d_d$, $d_q$). A second coordinate transformation circuit transforms the d-axis and q-axis modulation index signals ($d_d$, $d_q$) into modulation index signals in the stationary coordinate frame ($d_\alpha$, $d_\beta$). A space vector modulator having a continuous transition into the six-step mode of inverter operation modulates the modulation index signals in the stationary coordinate frame signals ($d_\alpha$, $d_\beta$) to produce outputs that drive the voltage source inverter.

An exemplary method comprises the following steps. A torque command comprising a q-axis current reference signal ($i_q^{ref}$) is supplied. The q-axis current reference signal ($i_q^{ref}$) is limited. A d-axis current reference signal ($i_d^{ref}$) is generated in a flux weakening loop. The current reference signals ($i_d^{ref}$, $i_q^{ref}$) are compared with d-axis and q-axis motor current signals ($i_d$, $i_q$) to produce current error signals. The current error signals are compensated to generate modulation index signals ($d_d$, $d_q$). The sum of the squares of the modulation index signals ($d_d$, $d_q$) is generated. The sum of the squares of the modulation index signals ($d_d$, $d_q$) is compared with the square of a modulation index ($d$) to produce a modulation index error signal. The modulation index error signal is adjusted (using proportional-integral regulation, for example) to generate the d-axis current reference ($i_q^{ref}$).

The present invention does not rely on look-up tables; the automatic transition is accomplished at any operating conditions. When compared to the method disclosed in the Song et al. paper, a major improvement provided by the present invention is that the measured value of the DC bus voltage is not needed to determine the on-set point for the flux weakening mode. In the present invention, the on-set point for the flux weakening mode is uniquely determined by the modulation index ($d$) at the boundary of six-step operation, and is the same for all values of DC bus voltage.

This aspect of the present invention provides for the ability to adjust the on-set point by changing the modulation index ($d_m^2$). For instance, when six-step operation should be disabled, the flux weakening on-set point ($d_m^2$) may be simply adjusted using software to a lower value, so that the flux weakening loop becomes active at lower speeds and/or lower torque values. In this way, sufficient voltage margin is provided automatically by injecting negative $i_q^{ref}$, and the inverter does not need to operate in full six-step mode to assure the current control. The present invention may also be used for speed or position control, if desired.

BRIEF DESCRIPTION OF THE DRAWINGS

The various features and advantages of the present invention may be more readily understood with reference to the following detailed description taken in conjunction with the accompanying drawings, wherein.

DESCRIPTION OF THE PREFERRED EMBODIMENT

Figure 1:
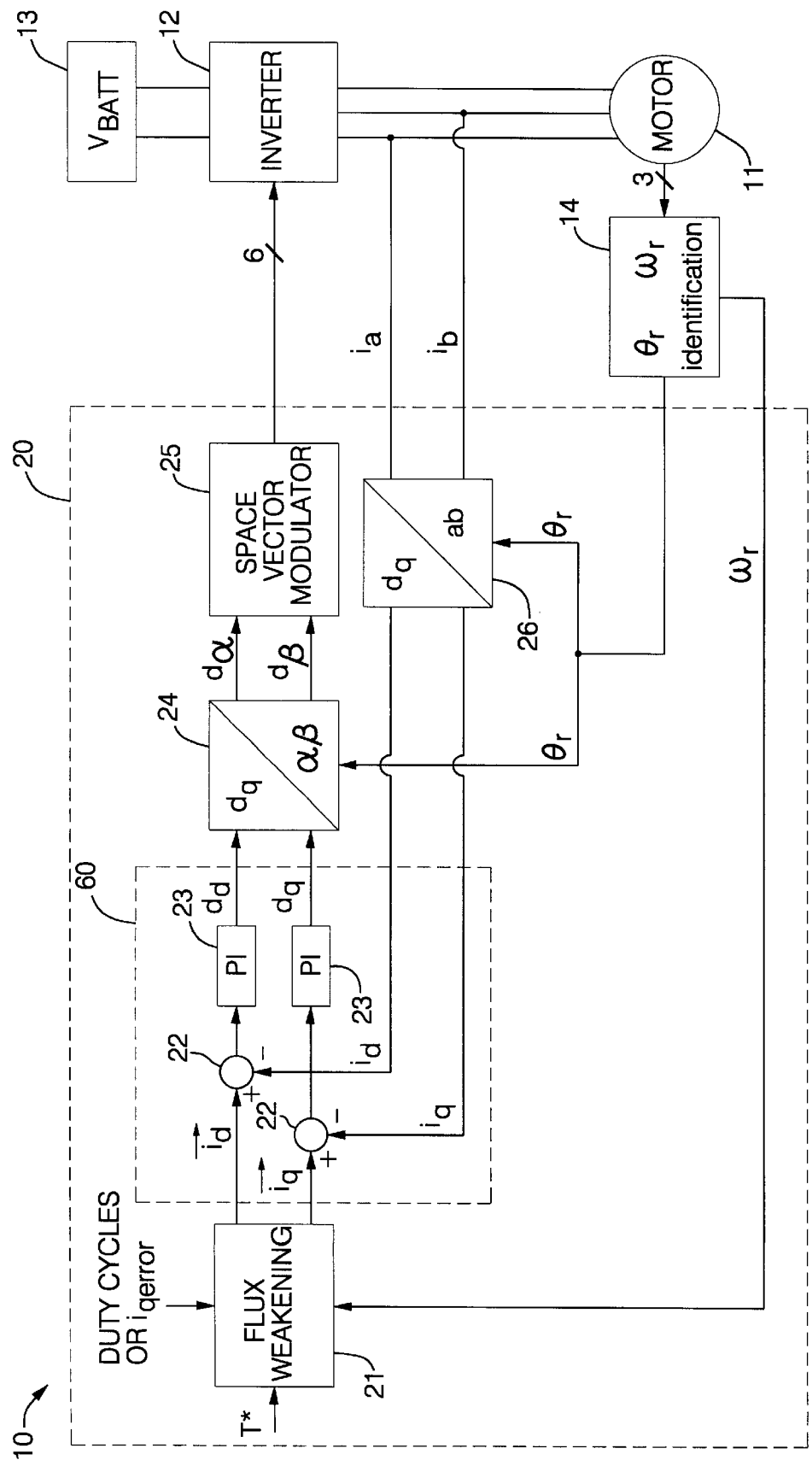
FIG. 1 illustrates a system block diagram of a surface-mounted permanent magnet synchronous machine drive employing an exemplary control system and method in accordance with the principles of the present invention.

Referring to the drawing figures, FIG. 1 illustrates a system block diagram of a surface-mounted permanent magnet synchronous machine drive 10 employing an exemplary control system 20 and method 30 in accordance with the principles of the present invention. The surface-mounted permanent magnet synchronous machine drive 10 comprises a motor 11 which is driven by a voltage source inverter 12 that is coupled to a battery 13 and controlled by the control system 20. The control system 20 may be implemented in the form of a digital signal processor (DSP), for example. Sensed rotor position ($\theta_r$) of the motor 11 is coupled by way of a measurement circuit 14 to the control system 20.

The control system 20 comprises a flux weakening circuit 21 that has as its inputs a torque command ($T^{ref}$), modulation index signals from the previous calculation ($d_d$, $d_q$), which are past the outputs of the current compensators. The measurement circuit 14 outputs the rotor position ($\theta_r$) of the motor 11 to a synchronous to stationary coordinate transformation circuit 24, and to a coordinate transform circuit 26 that processes measured motor phase current signals ($i_a$, $i_b$) and rotor position signal ($\theta_r$) to generate motor current signals in the synchronous frame ($i_d$, $i_q$).

The flux weakening circuit 21 outputs reference values for d and q current components ($i_d^{ref}$, $i_q^{ref}$) of the motor 11 (machine). The outputs of the flux weakening circuit 21 are coupled to first inputs of a current regulating loop 60. The current regulating loop 60 comprises first and second adders 22 and first and second proportional-integral (PI) regulators 23. The $i_d^{ref}$ and $i_q^{ref}$ reference currents are input to first inputs of separate adders 22. The adders 22 subtract the measured current signals ($i_d$, $i_q$), i.e., the d and q components ($i_d$, $i_q$) of the motor (machine) current derived from the transformation circuit 26, from the $i_d^{ref}$ and $i_q^{ref}$ reference currents from the flux weakening circuit 21 to produce difference signals.

The difference signals are input to the proportional-integral (PI) regulators 23 that produce d-axis and q-axis modulation index signals ($d_d$, $d_q$). The d-axis and q-axis modulation index signals ($d_d$, $d_q$) are input to the synchronous to stationary coordinate transformation circuit 24 which transforms the d-axis and q-axis modulation index signals ($d_d$, $d_q$) into modulation index signals in the stationary coordinate frame signals ($d_\alpha$, $d_\beta$). The modulation index signals in the stationary coordinate frame signals ($d_\alpha$, $d_\beta$) are modulated by a space vector modulator 25 having a six-step transformation whose six outputs drive the voltage source inverter 12.

Figure 2:
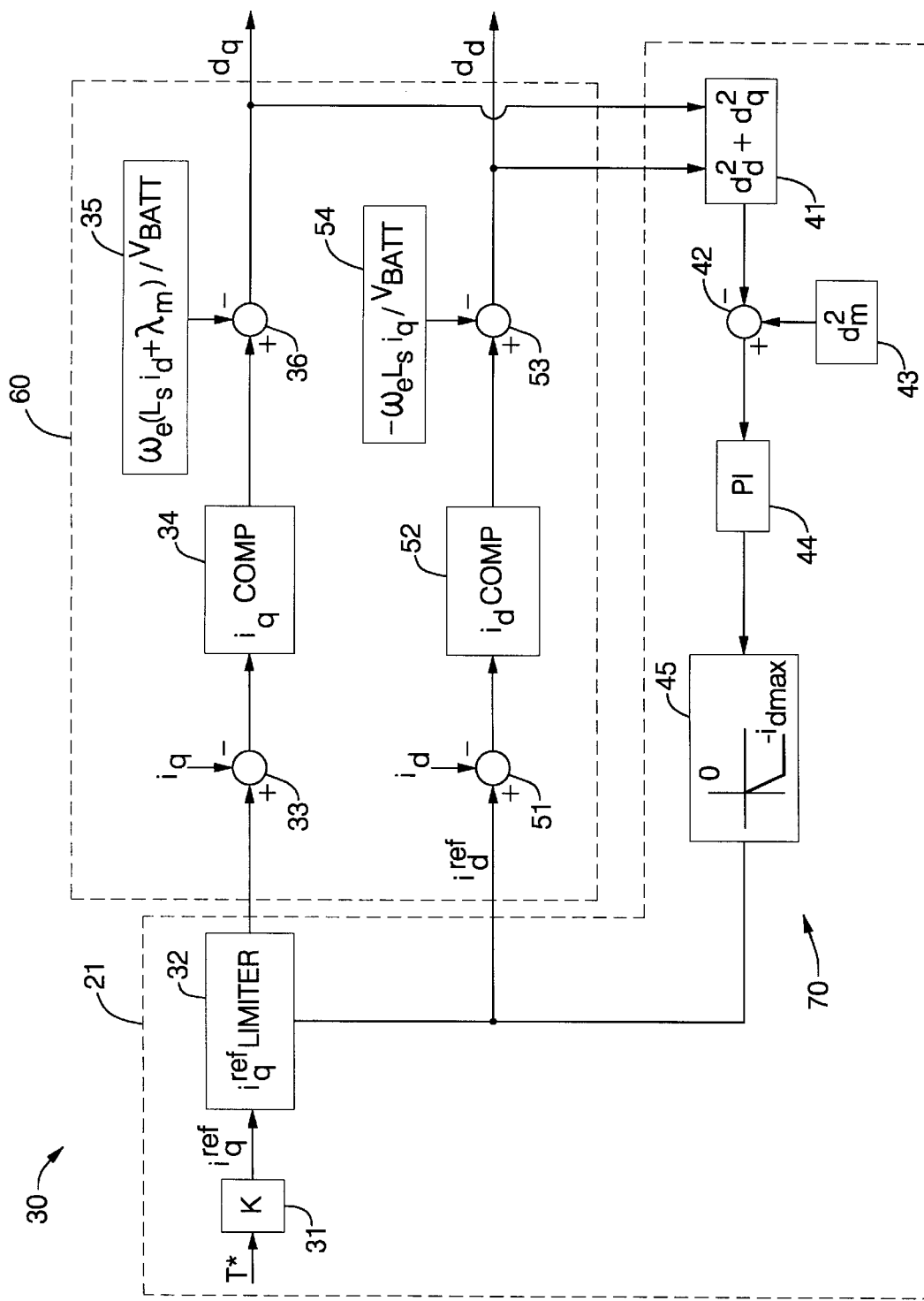
FIG. 2 illustrates details of the exemplary control system and method.

Details of the present invention are shown in FIG. 2, which provides a depiction of the control system 20 and control method 30. In FIG. 2, blocks 31, 32 and 41–45 are elements of the flux weakening circuit 21 in FIG. 1. Blocks 33–36 and 51–54 are components of the current regulating loop 60.

The control system 20 method 30 takes the torque command as an input. In surface-mounted synchronous permanent magnet machines 10, the torque is related to the q-axis current ($i_q$) of the motor 11 as:

$$T = 1.5 P \psi_f i_q, \quad [A]$$

where P is the number of machine pole pairs, $\psi_f$ is the flux of permanent magnets mounted on the rotor. Therefore, for a given torque reference, the corresponding q-axis current reference ($i_q^{ref}$) is, according to equation [A], expressed as:

$$i_q^* = KT^*, \quad [B]$$

The maximum achievable q-axis current (i.e., maximum torque) is determined by physical (voltage and current) machine limitations:

$$v_d^2 + v_q^2 \leq V_{max}^2, \quad i_d^2 + i_q^2 \leq I_{max}^2 \quad [C]$$

where $V_{max}$ and $I_{max}$ are maximum (per phase) voltage and current, respectively.

In the block diagram of FIG. 2, these limitations are shown as an $i_q^{ref}$ limiter 32. The d-axis current reference signal ($i_d^{ref}$) is generated in a flux weakening loop 70, comprising blocks 41–45 in FIG. 2. The current reference signals ($i_d^{ref}$, $i_q^{ref}$) are compared with d and q components of the machine current ($i_d$, $i_q$) in summing devices 33, 51 which output respective error signals. The error signals comprise inputs for the current regulating loop 60, comprising blocks 34–36 and 52–54. Current compensation (blocks 34, 52) is realized by proportional-integral (PI) regulators 23. Feed-forward terms (blocks 35 and 54) are added to the compensation current in separate adders 36, 53 in order to improve the stability margin of the current regulating loop 60 at high speeds.

Outputs ($d_d$, $d_q$) of the current regulating loop 60 are input to the flux weakening loop 70. The sum of the squares of the outputs of the current regulating loop 60 ($d_d^2$, $d_q^2$) is produced by block 41 and is compared in an adder 42 with the square of the modulation index (d) output by block 43. The output of the adder 42 is an error signal that is fed to a proportional-integral regulator 44 in the flux weakening loop 70. The proportional-integral regulator 44 provides appropriate dynamics for automatic adjustment of the d-axis current reference ($i_d^{ref}$).

To prevent unnecessary deep demagnetization of rotor permanent magnets, a limiter 45 is included in the flux weakening loop 70. The d-axis current reference ($i_d^{ref}$) is used for current regulation, as well as in q-axis current limiting, according to equation [C]. This feature of using the modulation index (d) as a condition for automatic start of flux weakening operation is very useful because this point can be easily changed by software when necessary, regardless of the value of DC bus voltage. The feed-forward terms (derived from blocks 35 and 54) are introduced to improve the stability and performance of the current regulating loop 60, especially at motor speeds that are significantly above base value.

The present system 20 and method 30 provide for an automatic transition to the flux weakening mode (operation above base speed), regardless of DC bus voltage, load or other operating conditions. This feature provides significant performance improvement. No look-up tables are used in the flux weakening loop 70. The on-set point for flux weakening is automatically adjusted and may be changed through software, and is a new feature provided by the present invention that improves the performance of the system. An appropriate d-axis current component is injected over the entire speed range, providing the maximum available torque (which corresponds to the q-axis current component).

The present invention has been fully simulated and has also been implemented in an electrical drive system to test out the operability thereof.

Thus, a system and method for controlling a surface-mounted permanent magnet synchronous machine drive over a wide speed range using a reference voltage have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A surface-mounted permanent magnet synchronous machine drive comprising:

a motor;

a voltage source inverter coupled between a battery and the motor that drives the motor;

a control system coupled to the inverter for controlling the inverter and the motor comprising:

- a first coordinate transformation circuit for processing measured motor phase current signals ($i_a$, $i_b$) and rotor position signals ($\theta_r$) to generate motor current signals ($i_d$, $i_q$) in a synchronous frame;
- a flux weakening circuit for processing torque command (T*) and d-axis and q-axis modulation index signals ($d_d$, $d_q$) calculated in a previous sampling interval to generate current reference signals ($i_d^{ref}$, $i_q^{ref}$) of the motor;
- a current regulating loop for processing the current reference signals ($i_d^{ref}$, $i_q^{ref}$) and the motor current signals ($i_d$, $i_q$) to generate d-axis and q-axis modulation index signals ($d_d$, $d_q$);
- a second coordinate transformation circuit for transforming the d-axis and q-axis modulation index signals ($d_d$, $d_q$) into modulation index signals ($d_\alpha$, $d_\beta$) in a stationary coordinate frame; and
- a space vector modulator for modulating the modulation index signals ($d_\alpha$, $d_\beta$) in the stationary coordinate frame to produce outputs that drive the voltage source inverter.

2. The machine drive recited in claim 1 wherein the flux weakening circuit comprises:

- a limiter for limiting the q-axis current reference signal ($i_q^{ref}$);
- d-axis and q-axis summing devices for comparing the current reference signals ($i_d^{ref}$, $i_q^{ref}$) with d-axis and q-axis components of the motor current ($i_d$, $i_q$) to produce current error signals;
- d-axis and q-axis compensation circuits for compensating the current error signals to generate d-axis and q-axis modulation index signals ($d_d$, $d_q$);
- a flux weakening loop for generating a sum of the squares ($d_d^2$, $d_q^2$) of the d-axis and q-axis modulation index signals ($d_d$, $d_q$), for comparing the sum of the squares of the d-axis and q-axis modulation index signals with the square of a modulation index ($d_m$) to produce an error signal, and for adjusting the d-axis current reference ($i_d^{ref}$) to generate the d-axis current reference ($i_d^{ref}$).

3. The machine drive recited in claim 2 wherein the flux weakening loop adjusts the d-axis current reference ($i_d^{ref}$) using a proportional-integral regulator to generate the d-axis current reference ($i_d^{ref}$).

4. The machine drive recited in claim 1 wherein the flux weakening loop further comprises a limiter for limiting the d-axis current reference ($i_d^{ref}$) to prevent deep demagnetization of permanent magnets in the motor.

5. The machine drive recited in claim 1 wherein the compensation circuits comprise proportional-integral regulators.

6. The machine drive recited in claim 1 further comprising:

- d-axis and q-axis adders for adding feed-forward components to the compensation current to improve the stability margin of the current regulation at high speeds.

7. A method of controlling a machine drive having a voltage source inverter coupled between a battery and a motor that drives the motor, comprising the steps of:

- generating a torque command comprising a q-axis current reference signal ($i_q^{ref}$);
- limiting the q-axis current reference signal ($i_q^{ref}$);
- generating a d-axis current reference signal ($i_d^{ref}$);
- comparing the d-axis and q-axis current reference signals ($i_d^{ref}$, $i_q^{ref}$) with d-axis and q-axis motor current signals ($i_d$, $i_q$) to produce current error signals;
- processing the current error signals to generate d-axis and q-axis modulation index signals ($d_d$, $d_q$);
- generating the sum of the squares of the d-axis and q-axis modulation index signals ($d_d$, $d_q$);
- comparing the sum of the squares of the d-axis and q-axis modulation index signals ($d_d$, $d_q$) with a square of a modulation index ($d_m$) to produce an error signal; and
- adjusting the d-axis current reference ($i_d^{ref}$) to generate the d-axis current reference ($i_d^{ref}$).

8. The method recited in claim 7 wherein the d-axis current reference ($i_d^{ref}$) is used for current regulation and in q-axis current limitation.

9. The method recited in claim 7 further comprising the step of limiting the d-axis current reference ($i_d^{ref}$) to prevent deep demagnetization of permanent magnets in the motor.

10. The method recited in claim 7 wherein current compensation is realized by proportional-integral regulation.

11. The method recited in claim 7 further comprising the step of:

- adding feed-forward components to the compensation current to improve the stability margin of the current regulation at high speeds.

* * * * *